United States Patent
Kang

(10) Patent No.: US 9,706,471 B1
(45) Date of Patent: Jul. 11, 2017

(54) METHOD FOR CONTROLLING FREEBOOTING OF VEHICLE HEAD UNIT USING GEOFENCE BEACON, APPARATUS AND SYSTEM THEREFOR

(71) Applicant: Hyundai Motor Company, Seoul (KR)

(72) Inventor: Hyeon Hee Kang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/145,051

(22) Filed: May 3, 2016

(30) Foreign Application Priority Data

Jan. 7, 2016 (KR) .......................... 10-2016-0002078

(51) Int. Cl.
| | | |
|---|---|---|
| *H04W 40/24* | (2009.01) |
| *B60R 25/24* | (2013.01) |
| *H04W 76/02* | (2009.01) |
| *H04W 4/00* | (2009.01) |
| *H04W 4/02* | (2009.01) |

(52) U.S. Cl.
CPC .......... *H04W 40/244* (2013.01); *B60R 25/24* (2013.01); *H04W 4/008* (2013.01); *H04W 4/021* (2013.01); *H04W 76/023* (2013.01)

(58) Field of Classification Search
CPC ... H04W 40/244; H04W 4/021; H04W 4/008; H04W 76/023; B60R 25/24
See application file for complete search history.

(56) References Cited

U.S. PATENT DOCUMENTS

2013/0196646 A1* 8/2013 Oh ........................ H04W 4/001
455/418
2013/0332007 A1* 12/2013 Louboutin ............ H04W 4/021
701/2

FOREIGN PATENT DOCUMENTS

| KR | 2006-0063208 A | 6/2007 |
| KR | 2012-0066214 A | 6/2012 |
| KR | 2013-0047082 A | 5/2013 |
| KR | 2015-0002954 A | 1/2015 |

* cited by examiner

*Primary Examiner* — Rodney Butler
(74) *Attorney, Agent, or Firm* — Mintz Levin Cohn Ferris Glovsky and Popeo, P.C.; Peter F. Corless

(57) ABSTRACT

A method of controlling freebooting of a vehicle head unit in a vehicle includes: transmitting a beacon frame while an ignition of the vehicle is turned off; receiving a first signal indicating that a Bluetooth function has been activated by a user equipment (UE) which received the beacon frame; and performing a freebooting procedure of the vehicle head unit in response to reception of the first signal.

13 Claims, 4 Drawing Sheets

METHOD FOR CONTROLLING FREEBOOTING OF VEHICLE HEAD UNIT USING GEOFENCE BEACON, APPARATUS AND SYSTEM THEREFOR

CROSS-REFERENCE TO RELATED APPLICATION

This application claims the benefit of and priority to Korean Patent Application No. 10-2016-0002078, filed on Jan. 7, 2016, which is hereby incorporated by reference as if fully set forth herein.

BACKGROUND OF THE DISCLOSURE

Technical Field

The present disclosure relates generally to a vehicle geofence system, and more particularly, to a method of controlling freebooting of a vehicle head unit using a geofence beacon, and an apparatus and system therefor capable of automatically controlling a Bluetooth function of a user equipment (UE) and operation of the vehicle head unit using the geofence beacon.

Discussion of the Related Art

With recent development in electronic control technology, various devices in a vehicle which have previously been operated using a mechanical scheme can now be operated using an electric scheme. As a result, driver convenience, driving safety, and the like have increased.

Recently, a concept known as a "geofence" has been applied to vehicles. The term "geofence" is created by combining the prefix "geo," which means "earth", "soil", etc., with the word "fence". A dictionary definition of "geofence" is a virtual boundary on actual terrain. When a monitored vehicle or an external terminal linked to the vehicle crosses a preset geofence, a geofence observer may detect the vehicle or the external terminal to control a particular device in the vehicle or provide various vehicle-related services to an external vehicle management center (e.g., a vehicle telematics server) or a preregistered device.

Meanwhile, many recently developed vehicles provide a Bluetooth pairing function for the vehicle to pair with a mobile phone. When a driver carrying a preregistered mobile phone enters such vehicle and activates a Bluetooth function of the mobile phone, a vehicle head unit having the Bluetooth function automatically detects the preregistered mobile phone and attempts Bluetooth pairing.

However, conventional Bluetooth pairing has been inconvenient in that a driver needs to activate a Bluetooth function of a mobile phone of the driver each time the driver starts a vehicle. Because battery consumption of the mobile phone is high when Bluetooth persistently activated, mobile phone users usually deactivate the Bluetooth function included in the mobile phone.

In addition, some recently developed vehicles have a freebooting function of a vehicle head unit. However, the function starts a freebooting procedure of the vehicle head unit when a vehicle receives a door unlocking signal. Thus, the function has been disadvantageous in that a driver cannot use various functions of the vehicle head unit until the freebooting procedure is completed after the driver enters the vehicle. In general, the vehicle head unit may provide a navigation function, a backup camera function, etc., in addition to a multimedia reproduction function.

SUMMARY OF THE DISCLOSURE

Accordingly, the present disclosure is directed to a method of controlling freebooting of a vehicle head unit using a geofence beacon, and an apparatus and system therefor that substantially obviate one or more problems due to limitations and disadvantages of the related art.

An object of the present disclosure is to provide a method of controlling freebooting of a vehicle head unit using a geofence beacon, and an apparatus and system therefor capable of automatically controlling a Bluetooth function of a user equipment (UE) and operation of the vehicle head unit using the geofence beacon. Another object of the present disclosure is to provide a method of controlling automatic booting of a vehicle head unit using a geofence beacon, and an apparatus and system therefor capable of inducing freebooting of the vehicle head unit by automatically activating a Bluetooth function of a preregistered UE when the UE is detected to enter a geofence through a geofence beacon.

Technical problems to be solved by the present disclosure are not limited to the above-mentioned technical problems, and other technical problems not mentioned herein may be clearly understood by those skilled in the art from description below.

To achieve these objects and other advantages, in accordance with embodiments of the present disclosure, a method of controlling freebooting of a vehicle head unit in a vehicle, includes: transmitting a beacon frame while an ignition of the vehicle is turned off; receiving a first signal indicating that a Bluetooth function has been activated by a user equipment (UE) which received the beacon frame; and performing a freebooting procedure of the vehicle head unit in response to reception of the first signal.

The method may further include detecting whether a door of the vehicle has been unlocked during the freebooting procedure. An automatic Bluetooth pairing procedure may be performed with the UE when the door is detected to have been unlocked.

The method may further include detecting whether a door of the vehicle has been unlocked during the freebooting procedure. The freebooting procedure in progress may be terminated when the door of the vehicle is kept locked during a predetermined first time.

The method may further include receiving a second signal indicating that the Bluetooth function has been deactivated by the UE. The freebooting procedure may be terminated in response to reception of the second signal.

The method may further include blocking the transmission of the beacon frame when the first signal and the second signal are repeatedly and alternately received a predetermined number of times during a predetermined unit of time.

The freebooting of the vehicle head unit may be controlled based on door unlocking of the vehicle when the first signal and the second signal are repeatedly and alternately received the predetermined number of times during the predetermined unit of time.

The transmission of the beacon frame may be resumed once the vehicle has stopped after driving, the ignition of the vehicle is turned off, and then a door of the vehicle is locked.

The beacon frame may include vehicle identification information for uniquely identifying the vehicle, and the first signal may be received from the UE when vehicle information included in the UE is identical to the vehicle identification information included in the beacon frame received by the UE.

The vehicle identification information may include at least one of a vehicle identification number (VIN) and license plate information.

The beacon frame may further include user identification information for identifying a device available for automatic Bluetooth pairing and registered in the vehicle head unit, and the Bluetooth function of the UE may be automatically activated when automatic Bluetooth pairing with the vehicle head unit is verified to be available by the UE based on the user identification.

The user identification information may include at least one of a phone number and a device name.

The beacon frame may correspond to a beacon frame defined in a Wi-Fi standard.

Furthermore, according to embodiments of the present disclosure, a method of controlling freebooting in a vehicle head unit linked with a beacon unit and a door locking unit, includes: receiving a freebooting start request signal from the beacon unit, performing a freebooting procedure according to the freebooting start request signal, receiving a door unlocking notification signal from the door locking unit during the freebooting procedure, and searching for a user equipment (UE) for automatic Bluetooth pairing according to the door unlocking notification signal.

Furthermore, according to embodiments of the present disclosure, a method of controlling freebooting of a vehicle head unit in a beacon unit establishing a vehicle geofence, includes: transmitting a beacon frame including vehicle identification information while an ignition of a vehicle is turned off; receiving a first signal indicating that a Bluetooth function has been activated from a user equipment (UE) which received the beacon frame; and transmitting a freebooting start request signal to the vehicle head unit in response to reception of the first signal. A freebooting procedure of the vehicle head unit is started according to the freebooting start request signal.

Furthermore, according to embodiments of the present disclosure, an apparatus for controlling freebooting of a vehicle head unit, includes: the vehicle head unit performing an automatic Bluetooth pairing procedure with a preregistered device, and a beacon unit transmitting a beacon frame for establishing a vehicle geofence while an ignition of a vehicle is turned off and transmitting a freebooting start request signal to the vehicle head unit when a first signal indicating that a Bluetooth function has been activated is received from a UE receiving the beacon frame. The vehicle head unit searches for the UE to perform the automatic Bluetooth pairing procedure when a freebooting procedure started according to the freebooting start request signal is normally completed in the vehicle head unit.

The apparatus may further include a door control unit transmitting a door unlocking notification signal to the vehicle head unit when the vehicle is unlocked. The vehicle head unit may start to search for the UE to perform the automatic Bluetooth pairing procedure when the door unlocking notification signal is received.

Furthermore, according to embodiments of the present disclosure, a non-transitory computer readable medium containing program instructions for controlling freebooting of a vehicle head unit in a vehicle includes: program instructions that transmit a beacon frame while an ignition of the vehicle is turned off; program instructions that receive a first signal indicating that a Bluetooth function has been activated by a user equipment (UE) which received the beacon frame; and program instructions that perform a freebooting procedure of the vehicle head unit in response to reception of the first signal.

It should be noted that the above-mentioned technical solutions are merely a part of embodiments of the present disclosure, and various embodiments reflecting technical features of the present disclosure may be derived and understood by those skilled in the art from detailed description of the present disclosure given below.

Figure 1:
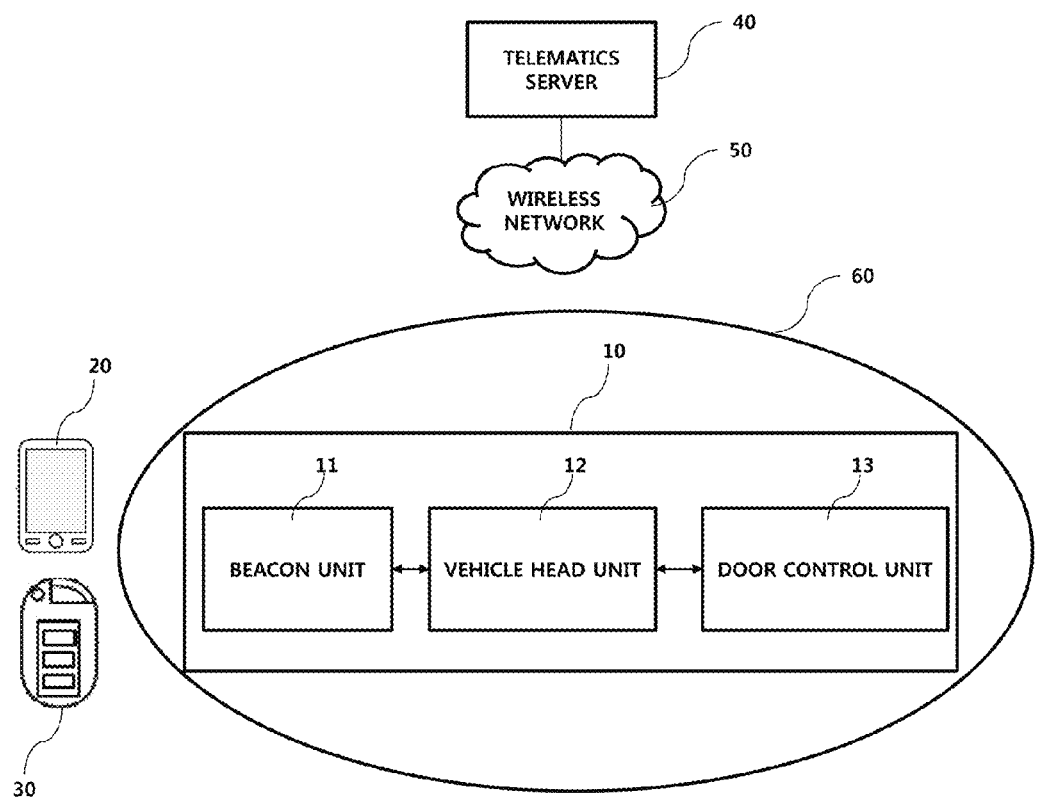
FIG. 1 is a block diagram of a system configuration for description of a freebooting procedure of a vehicle head unit according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE DISCLOSURE

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

Reference will now be made in detail to an apparatus and various methods to which the preferred embodiments of the present disclosure are applied. The suffixes "module" and "unit" of elements herein are used for convenience of description and thus can be used interchangeably and do not have any distinguishable meanings or functions.

Although all elements constituting the embodiments of the present disclosure are described as being integrated into a single one or operated as a single one, the present disclosure is not necessarily limited to such embodiments. According to embodiments, all of the elements may be selectively integrated into one or more and be operated as one or more within the object and scope of the present disclosure. Each of the elements may be implemented as independent hardware. Alternatively, some or all of the elements may be selectively combined into a computer program having a program module performing some or all functions combined in one or more pieces of hardware. Code and code segments constituting the computer program may be easily reasoned by those skilled in the art to which the present disclosure pertains. The computer program may be stored in computer readable media such that the computer program is read and executed by a computer to implement embodiments of the present disclosure. Computer program storage media may include magnetic recording media, optical recording media, and carrier wave media.

The terms "comprises", "includes", and "has" described herein should be interpreted not to exclude other elements but to further include such other elements since the corresponding elements may be inherent unless mentioned otherwise. All terms including technical or scientific terms have the same meanings as generally understood by a person having ordinary skill in the art to which the present disclosure pertains unless mentioned otherwise. Generally used terms, such as terms defined in a dictionary, should be interpreted to coincide with meanings in the related art from the context. Unless obviously defined in the present disclosure, such terms should not be interpreted as having ideal or excessively formal meanings.

It will be understood that, although the terms first, second, A, B, (a), (b), etc. may be used herein to describe various elements of the present disclosure, these terms are only used to distinguish one element from another element and essence, order, or sequence of corresponding elements are not limited by these terms. It will be understood that when one element is referred to as "connected to", "coupled to", or "accessing" another element, one element may be "connected to", "coupled to", or "access" another element via a further element although one element may be directly connected to or directly access another element.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Referring now to the disclosed embodiments, FIG. 1 illustrates a system configuration for description of a freebooting procedure of a vehicle head unit according to embodiments of the present disclosure.

As shown in FIG. 1, a system for controlling freebooting of the vehicle head unit according to embodiments of the present disclosure may include a vehicle 10, a user equipment (UE) 20, a smart key 30, a telematics server 40, and a wireless network 50. For the purposes of the present disclosure, the UE 20 may include any device capable of performing Bluetooth communication, including, for instance, a smart phone, tablet, PDA, laptop, and the like. However, the UE 20 is not limited only to the communication devices listed above. The above components of the system are not essential, and thus more or fewer components may be included.

The vehicle 10 may include a beacon unit 11, a vehicle head unit 12, and a door control unit 13.

The beacon unit 11 may periodically transmit a beacon frame to establish a geofence around the vehicle 10. For example, the beacon frame may correspond to a beacon frame transmitted by an access point (AP) according to a Wi-Fi standard. However, this is merely an example, and a beacon frame disclosure may additionally or alternatively include at least one of a predetermined control instruction for establishing a geofence in a certain radius of the vehicle 10 and automatically activating a Bluetooth function included in the UE 20, information for identifying a vehicle (hereinafter simply referred to as "vehicle identification information"), and information for identifying a particular UE registered in the vehicle 10 (hereinafter simply referred to as "user identification information"). It should be noted that other information may be added to the beacon frame.

A vehicle geofence according to the present disclosure may be established within a range within which a beacon frame may be normally received by the UE 20.

In other words, the vehicle geofence may be determined according to transmitted signal strength of the beacon frame.

In addition, according to embodiments of the present disclosure, transmitted signal strength of the beacon frame may be set by a user using the vehicle head unit 12 or another input means included in the vehicle 10 (e.g., a button, a jog wheel, a touch input, etc.). In other words, the user may arbitrarily set a size of a vehicle geofence area through predetermined menu input.

The beacon unit 11 according to the present embodiment may perform two-way communication with the UE 20. For example, when a beacon frame is received, the UE 20 may extract vehicle identification information from the received beacon frame, and verify whether the extracted vehicle identification information is identification information corresponding to a preregistered vehicle. For example, the vehicle identification information may include at least one of a vehicle identification number (VIN) and a number of a vehicle written on a license plate. However, the disclosure is not limited thereto, and information for uniquely identifying a particular vehicle is sufficient.

When an extracted VIN is identical to vehicle identification information present in the UE 20 as a result of verification, the UE 20 may automatically activate the Bluetooth function. Subsequently, the UE 20 may transmit a predetermined control signal reporting that the Bluetooth function has been activated to the beacon unit 11.

Upon verifying that the Bluetooth function of the UE 20 has been activated, the beacon unit 11 may transmit a predetermined control signal for freely booting the vehicle head unit 12 to the vehicle head unit 12 connected to an in-vehicle communication network. Here, the in-vehicle communication network may include one of a controller area network (CAN) communication network, a local interconnect network (LIN) communication network, an Ethernet communication network, a Wi-Fi communication network, and a FlexRay communication network. However, this is merely an example, and a communication network that can be installed in the vehicle is sufficient.

Upon receiving the control signal for freebooting from the beacon unit 11, the vehicle head unit 12 may start the freebooting procedure. As an example, when the freebooting procedure is completed, an automatic Bluetooth pairing function may be activated, and thus the vehicle head unit 12 may start a scan procedure of the UE 20.

As another example, upon receiving a predetermined door unlocking notification signal indicating that a door has been unlocked from the door control unit 13, the vehicle head unit 12 may scan the UE 20 to start an automatic Bluetooth pairing procedure. For example, upon receiving a predetermined unlocking instruction from the smart key 30, the door control unit 13 may transmit the door unlocking notification signal to the vehicle head unit 12.

As another example, when the door is unlocked using a general vehicle key, the door control unit 13 may transmit the door unlocking notification signal to the vehicle head unit 12.

As another example, a predetermined remote vehicle control application for remote vehicle control may be installed in the UE 20. In this case, the user may directly transmit a door unlocking instruction to the vehicle head unit 12 by selecting a predetermined menu of the remote vehicle control application. In this instance, the vehicle head unit 12 may start the scan procedure of the UE 20 for automatic Bluetooth pairing simultaneously with transmitting the received door unlocking instruction to the door control unit 13. Here, the door unlocking instruction through the remote vehicle control application may be delivered to the vehicle head unit 12 through the telematics server 40 connected to the wireless network 50. For example, examples of the wireless network 50 may include a wideband code division multiple access (WCDMA) network, a long term evolution (LTE)/LTE-advanced (LTE-A) network, a Wi-Fi network, a vehicle-dedicated wireless communication network, etc.

The vehicle head unit 12 may receive the door unlocking notification signal from the door control unit 13 for a predetermined period of time during or after the freebooting procedure, or may be automatically turned off when the door unlocking instruction is not received from the telematics server 40.

As another example, the vehicle head unit 12 may be automatically turned off when the vehicle is not started or a change gear is not operated for a predetermined period of time during or after the freebooting procedure.

In addition, when the door unlocking notification signal is received from the door control unit 13 or the door unlocking instruction is received from the telematics server within a predetermined period of time after the freebooting procedure is completed, the vehicle head unit 12 may transmit a predetermined control signal for blocking transmission of a beacon frame to the beacon unit 11. In this case, the vehicle geofence may be canceled.

In addition, for example, when the driver exits the vehicle after driving and thus the door is locked or ignition of the vehicle is turned off, the vehicle head unit 12 may transmit a predetermined control signal that instructs start of transmission of a beacon frame to the beacon unit 11. In this case, the vehicle geofence may be established. For example, exiting from the vehicle by the driver may be detected when the smart key 30 is determined to be absent from the vehicle through a predetermined smart key detection sensor, or a Bluetooth link established between the UE 20 and the vehicle head unit 12 is canceled.

In addition, when the door unlocking notification signal is not received from the door control unit 13 or the door unlocking instruction is not received from the telematics server 40 within a predetermined period of time (e.g., 10 minutes, however the disclosure is not limited thereto) after the freebooting procedure is completed, the vehicle head unit 12 may transmit a predetermined control signal for deactivating the Bluetooth function (hereinafter referred to as a "Bluetooth deactivation control signal") to the beacon unit 11. Upon receiving the Bluetooth deactivation control signal, the beacon unit 11 may generate and transmit a beacon frame including a predetermined control instruction for deactivating the Bluetooth function of the UE 20. Subsequently, the UE 20 may deactivate the Bluetooth function in response to reception of the beacon frame.

According to embodiments of the present disclosure, when the beacon frame transmitted by the beacon unit 11 of the preregistered vehicle is detected, that is, when the vehicle geofence is entered, the UE 20 may automatically activate the Bluetooth function, and transmit a predetermined first control signal indicating that the beacon frame has been detected to the beacon unit 11. On the other hand, when the beacon frame is not detected for a predetermined period of time after the beacon frame has been detected, the UE 20 may transmit a predetermined second control signal indicating that the beacon frame is not detected any more to the vehicle head unit 12, and then deactivate the activated Bluetooth function.

In this instance, the beacon unit 11 may perform a control operation such that the vehicle head unit 12 starts the freebooting procedure when the first control signal is received, and perform a control operation such that the vehicle head unit 12 suspends the freebooting procedure in progress when the second control signal is received.

According to embodiments of the present disclosure, when the first control signal and the second control signal are alternately received several times during a unit time (e.g., the first control signal and the second control signal may be alternately received three times within 10 minutes, however the disclosure is not limited thereto; it should also be noted that the unit of time and the number of times at which the signals are alternately received may be changed), the beacon unit 11 may suspend transmission of the beacon frame or may be automatically turned off. When the beacon unit 11 is turned off or transmission of the beacon frame is suspended, the vehicle head unit 12 may perform a control operation such that the freebooting procedure is performed only by door unlocking. Thereafter, when the driver exits the vehicle after completing driving and thus the door is locked, the beacon unit 11 may resume transmission of the beacon frame.

Figure 2:
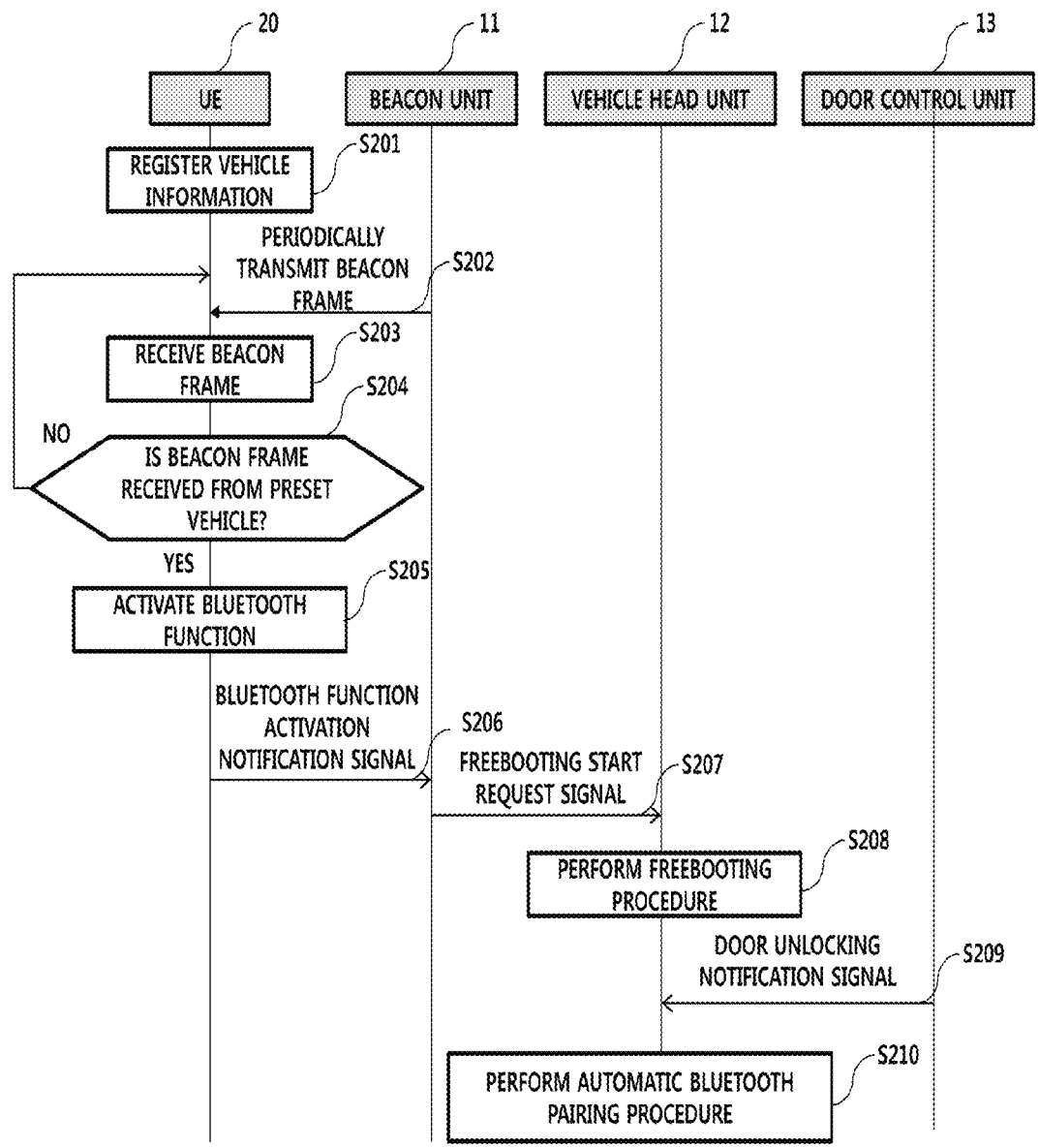
FIG. 2 is a flowchart for description of a freebooting control procedure of the vehicle head unit according to embodiments of the present disclosure.

FIG. 2 is a flowchart for description of a freebooting control procedure of the vehicle head unit according to embodiments of the present disclosure.

As shown in FIG. 2, in S201, vehicle information for freebooting of the vehicle head unit may be registered through a predetermined menu setting function included in the UE 20. Here, the vehicle information may include at least one of VIN information and license plate information.

When ignition of the vehicle is turned OFF, the beacon unit 11 may transmit a beacon frame at predetermined intervals in S202. For example, the beacon frame may include at least one of vehicle identification information for identifying a vehicle that transmits a beacon frame, a control instruction, and user identification information. Here, the user identification information may correspond to vehicle information registered in the UE 20, and the control instruction may include an instruction for activating or deactivating the Bluetooth function included in the UE 20.

Upon receiving a beacon frame, the UE 20 may verify whether the beacon frame is received from a vehicle registered in S201 based on vehicle identification information included in the beacon frame in S203 and S204.

When the beacon frame is a beacon frame received from a preregistered vehicle as a result of verification, and a control instruction included in the beacon frame instructs that the Bluetooth function be activated, the UE 20 may automatically activate the Bluetooth function in S205.

As a first example, when the Bluetooth function is activated, the UE 20 may transmit a predetermined Bluetooth function activation notification signal indicating that the Bluetooth function has been activated to the beacon unit 11 in S206.

As a second example, when the Bluetooth function is activated, the UE 20 may transmit a predetermined Bluetooth function activation notification signal indicating that the Bluetooth function has been activated to the telematics server 40 through the wireless network 50, and then the telematics server 40 may deliver the notification signal to the vehicle head unit 12 including a telematics terminal.

In the first example, when the Bluetooth function activation notification signal is received, the beacon unit may transmit a predetermined freebooting start request signal to the vehicle head unit 12 through the in-vehicle communication network in S207.

When the freebooting start request signal is received from the beacon unit 11 according to the first example, or when the Bluetooth function activation notification signal is received from the telematics server 40, the vehicle head unit 12 may perform the freebooting procedure in S208.

When the door unlocking notification signal indicating that the door has been unlocked is received from the door control unit 13, the vehicle head unit 12 may perform the automatic Bluetooth pairing procedure with the UE 20 in S209 and S210.

For example, when the door unlocking notification signal is received while the freebooting procedure is in progress, the vehicle head unit 12 may start the automatic Bluetooth pairing procedure after waiting until the freebooting procedure is completed. On the other hand, when the door unlocking notification signal is received after the freebooting procedure is completed, the vehicle head unit 12 may immediately start the automatic Bluetooth pairing procedure.

Figure 3:
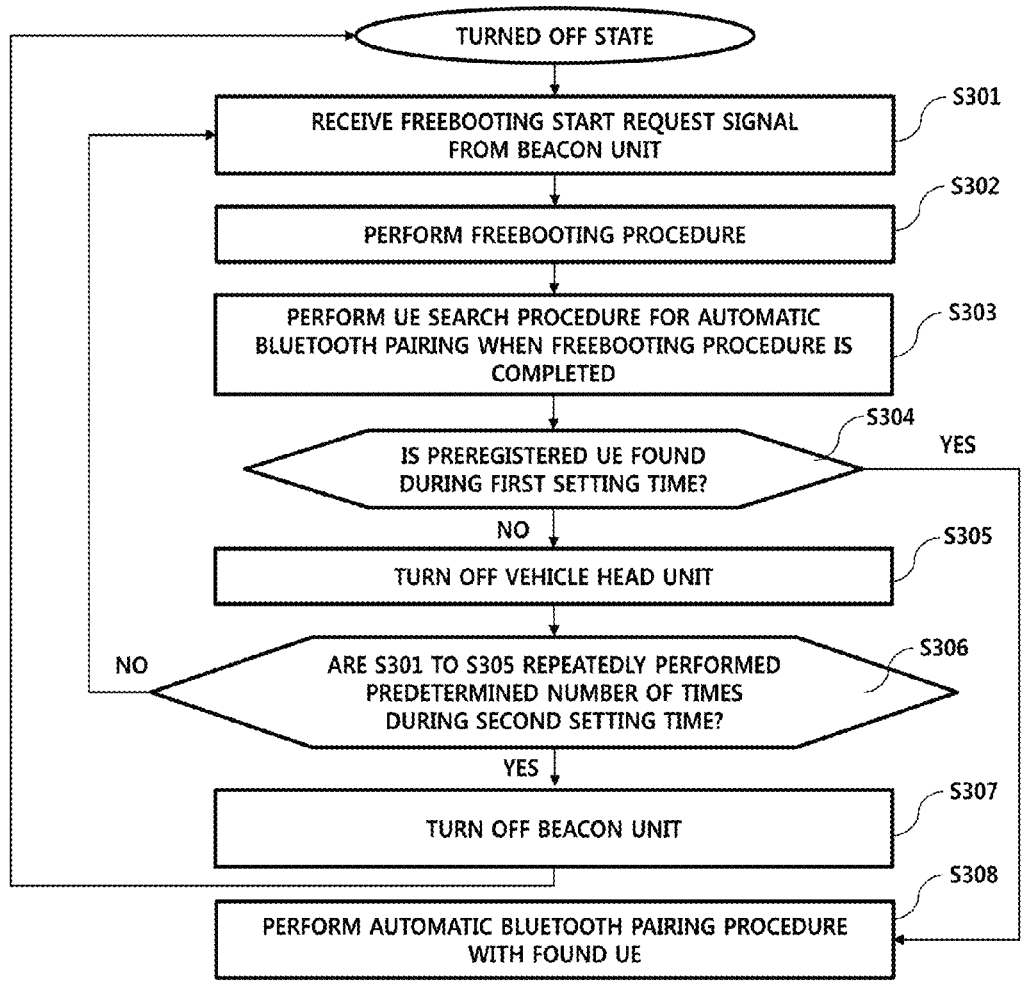
FIG. 3 is a flowchart for description of a freebooting control procedure of the vehicle head unit according to embodiments of the present disclosure.

FIG. 3 is a flowchart for description of a freebooting control procedure of the vehicle head unit according to embodiments of the present disclosure.

As shown in FIG. 3, the vehicle head unit 12 may receive a freebooting start request signal from the beacon unit 11 in S301. In this instance, the vehicle head unit 12 may perform a freebooting procedure according to the freebooting start request signal in S302.

When the freebooting procedure is completed, the vehicle head unit 12 may perform a UE search procedure for automatic Bluetooth pairing in S303. Subsequently, in S304, the vehicle head unit 12 may verify whether a preregistered UE is found during a predetermined first setting time. According to embodiments of the present disclosure, the vehicle head unit 12 may start the UE search procedure for automatic Bluetooth pairing when a door unlocking notification signal is received from the door control unit 13 after the freebooting procedure is started.

When the preregistered UE is not found as a result of verification, the vehicle head unit 12 may automatically turn OFF the vehicle head unit 12 in S305.

In S306, the vehicle head unit 12 may verify whether S301 to S305 are repeatedly performed a predetermined number of times during a predetermined second setting time.

When the vehicle head unit 12 is turned on/off a predetermined number of times during the second setting time as a result of verification in S306, i.e., when the driver is determined to have no intention to enter the vehicle, the vehicle head unit 12 may perform a control operation such that the beacon unit 11 is turned off in S307. In this case, freebooting of the vehicle head unit may be controlled to be performed only by door unlocking. However, when the vehicle is stopped after being driven to turn off ignition of the vehicle, and then the door is locked, power may be applied to the beacon unit 11 again. Thus, the beacon unit 11 may transmit a beacon frame to establish a vehicle geofence.

When the preregistered UE is found within the first setting time as a result of verification in S304, the vehicle head unit 12 may perform an automatic Bluetooth pairing procedure with the found UE in S308.

Figure 4:
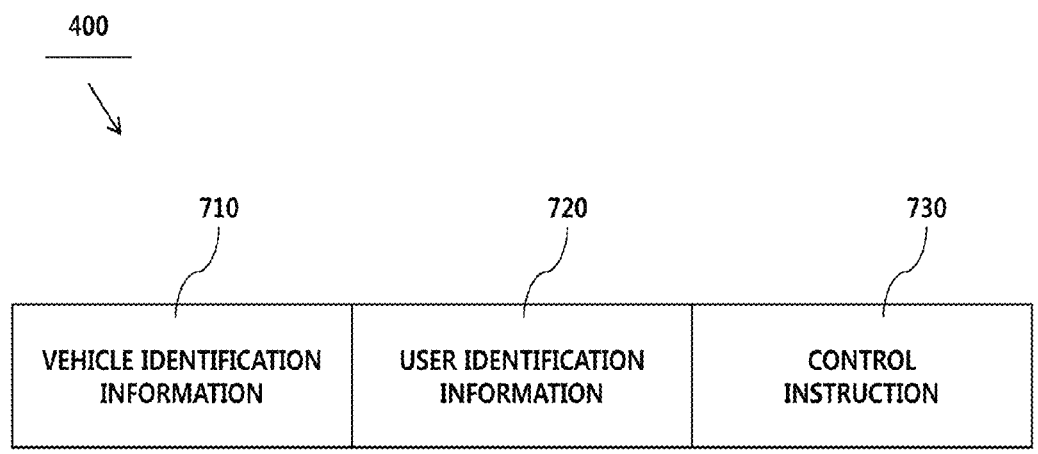
FIG. 4 is a diagram for description of a structure of a beacon frame according to embodiments of the present disclosure.

FIG. 4 is a diagram for description of a structure of a beacon frame 400 according to embodiments of the present disclosure.

As shown in FIG. 4, the beacon frame 400 may include at least one of fields corresponding to vehicle identification information 710, user identification information 720, and a control instruction 730. The above structure of the beacon frame 400 is merely an example, and it should be noted that more fields may be included or some fields may be deleted.

The vehicle identification information 710 may correspond to information for uniquely identifying a vehicle and include a VIN, license plate information, etc. The vehicle identification information 710 may be used as information for determining whether a beacon frame received from the UE is a beacon frame received from a vehicle preregistered in the UE.

The user identification information 720 may correspond to information for identifying a UE available for automatic Bluetooth pairing. For example, the user identification information 720 may include a phone number of the UE, a device name of the UE, etc. However, the disclosure is not limited thereto, and information for uniquely identifying a UE is sufficient.

Upon receiving the beacon frame, the UE according to the present embodiments may determine whether the UE is a device available for automatic Bluetooth pairing with the vehicle based on the user identification information included in the beacon frame. Therefore, the UE may automatically activate a Bluetooth function only when the UE is a device registered for automatic Bluetooth pairing.

A particular control instruction for controlling a particular function of the UE may be recorded in the field of the control instruction 730. For example, the control instruction 730 may include an instruction for instructing that the Bluetooth function be activated, an instruction for instructing that the Bluetooth function be deactivated, etc. However, the disclosure is not limited thereto, and it should be noted that another instruction may be additionally defined by a developer as needed.

The beacon frame 400 according to the present embodiments may further include beacon unit type information (not illustrated) for verifying whether the beacon unit 11 may perform two-way communication. In this case, when the Bluetooth function is activated, the UE receiving the beacon frame may determine whether the beacon unit 11 may perform two-way communication based on the beacon unit type information. When the beacon unit 11 is able to perform two-way communication as a result of determination, the UE may transmit a Bluetooth function activation notification signal to the beacon unit 11. On the other hand, when the beacon unit 11 is determined to be unable to perform two-way communication, the UE may transmit the Bluetooth function activation notification signal to the telematics server 40. In this instance, the telematics server 40 may deliver the Bluetooth function activation notification signal received through the wireless network 50 to the vehicle head unit 12.

Effects of the method and apparatus according to the present disclosure are described below.

The present disclosure provides a method of controlling freebooting of a vehicle head unit using a geofence beacon, and an apparatus and system therefor. The present disclosure is advantageous in that a method of controlling freebooting of a vehicle head unit using a geofence beacon, and an apparatus and system therefor, are capable of automatically controlling a Bluetooth function of a UE and operation of the vehicle head unit using the geofence beacon. In addition, the present disclosure is advantageous in that a driver may use a function of a vehicle head unit immediately after entering a vehicle by starting a freebooting procedure of the vehicle head unit simultaneously with automatically activating a Bluetooth function of a preregistered UE when the preregistered UE is detected to enter a geofence through a geofence beacon.

Effects that may be obtained from the present disclosure are not limited to the above-mentioned effects, and other effects not mentioned herein may be clearly understood by those skilled in the art from the above description.

Although the above description has been given with reference to embodiments of the present disclosure, it should be understood by those skilled in the art that the present disclosure may be corrected and changed in various manners without departing from the spirit and scope of the present disclosure described in claims below.

What is claimed is:

1. A method of controlling freebooting of a vehicle head unit in a vehicle, comprising:
    transmitting, by a beacon unit, a beacon frame while an ignition of the vehicle is turned off;
    receiving, at the vehicle head unit, a first signal indicating that a Bluetooth function has been activated by a user equipment (UE) which received the beacon frame through a wireless network;
    causing, by the beacon unit, a freebooting procedure of the vehicle head unit to start in response to reception of the first signal;
    detecting, by a door control unit, whether a door of the vehicle has been unlocked during the freebooting procedure; and
    performing, by the vehicle head unit, an automatic Bluetooth pairing procedure with the UE when the door is detected to have been unlocked during the freebooting procedure,
    wherein the freebooting procedure is a booting procedure of the vehicle head unit starting automatically before the vehicle head unit receives a door unlocking notification signal from the door control unit.

2. The method according to claim 1, further comprising:
    causing, by the beacon unit, the freebooting procedure in progress to terminate when the door of the vehicle is kept locked during a predetermined first time.

3. The method according to claim 1, further comprising:
    receiving a second signal indicating that the Bluetooth function has been deactivated by the UE,
    wherein the freebooting procedure is terminated in response to reception of the second signal.

4. The method according to claim 3, further comprising:
    blocking the transmission of the beacon frame when the first signal and the second signal are repeatedly and alternately received a predetermined number of times during a predetermined unit of time.

5. The method according to claim 4, wherein the freebooting of the vehicle head unit is controlled based on door unlocking of the vehicle when the first signal and the second signal are repeatedly and alternately received the predetermined number of times during the predetermined unit of time.

6. The method according to claim 4, wherein the transmission of the beacon frame is resumed once the vehicle has stopped after driving, the ignition of the vehicle is turned off, and then a door of the vehicle is locked.

7. The method according to claim 1, wherein:
    the beacon frame includes vehicle identification information for uniquely identifying the vehicle, and
    the first signal is received from the UE when vehicle information included in the UE is identical to the vehicle identification information included in the beacon frame received by the UE.

8. The method according to claim 7, wherein the vehicle identification information includes at least one of a vehicle identification number (VIN) and license plate information.

9. The method according to claim 7, wherein:
    the beacon frame further includes user identification information for identifying a device available for automatic Bluetooth pairing and registered in the vehicle head unit, and
    the Bluetooth function of the UE is automatically activated when automatic Bluetooth pairing with the vehicle head unit is verified to be available by the UE based on the user identification.

10. The method according to claim 9, wherein the user identification information includes at least one of a phone number and a device name.

11. The method according to claim 1, wherein the beacon frame corresponds to a beacon frame defined in a Wi-Fi standard.

12. A method of controlling freebooting in a vehicle head unit linked with a beacon unit and a door locking unit, comprising:
    receiving, at the vehicle head unit, a freebooting start request signal from the beacon unit when the beacon unit receives a first signal through a wireless network indicating that a Bluetooth function of a user equipment (UE) has been activated while an ignition of the vehicle is turned off;
    causing, by the beacon unit, a freebooting procedure of the vehicle head unit to start according to the freebooting start request signal;
    receiving, at the vehicle head unit, a door unlocking notification signal from the door locking unit during the freebooting procedure;
    searching, by the vehicle head unit, for the UE to perform automatic Bluetooth pairing according to the door unlocking notification signal; and
    performing, by the vehicle head unit, the automatic Bluetooth pairing with the UE when the door is detected to have been unlocked during the freebooting procedure,
    wherein the freebooting procedure is a booting procedure of the vehicle head unit starting automatically before the vehicle head unit receives the door unlocking notification signal from the door control unit.

13. A method of controlling freebooting of a vehicle head unit in a beacon unit establishing a vehicle geofence, comprising:

transmitting, by the beacon unit, a beacon frame including vehicle identification information while an ignition of a vehicle is turned off;

receiving, at the vehicle head unit, a first signal indicating that a Bluetooth function has been activated from by a equipment (UE) which received the beacon frame through a wireless network;

transmitting, by the beacon unit, a freebooting start request signal for starting a freebooting procedure of the vehicle head unit to the vehicle head unit in response to reception of the first signal; and performing, by the vehicle head unit, an automatic Bluetooth pairing with the UE when the door is detected by a door control unit to have been unlocked during the freebooting procedure, wherein the freebooting procedure is a booting procedure of the vehicle head unit starting automatically before the vehicle head unit receives a door unlocking notification signal from the door control unit.

\* \* \* \* \*